United States Patent [19]

Fajans

[11] 3,715,734

[45] Feb. 6, 1973

[54] MEMORY STORAGE DEVICE AND METHOD OF MAKING THE SAME

[76] Inventor: Jack Fajans, 1133 Magnolia Road, Teaneck, N.J. 07666

[22] Filed: Nov. 12, 1970

[21] Appl. No.: 89,114

Related U.S. Application Data

[63] Continuation-in-part of Ser. No. 871,573, Oct. 10, 1969, abandoned, and a continuation of Ser. No. 599,608, Dec. 6, 1966, abandoned.

[52] U.S. Cl...340/173 LM, 340/173 R, 340/173 CC, 346/76 R, 350/160 R

[51] Int. Cl. .............................................G11c 13/04

[58] Field of Search......340/173 R, 173 CC, 173 LT, 340/173 LM, 173 LS, 173 TP

[56] References Cited

UNITED STATES PATENTS

| | | | |
|---|---|---|---|
| 3,466,616 | 9/1969 | Bron | 340/173 CC |
| 3,474,248 | 10/1969 | Brown | 340/173 CC |
| 3,508,208 | 4/1970 | Duguay | 340/173 CC |
| 3,541,338 | 11/1970 | Duda | 340/173 CC |

*Primary Examiner*—Terrell W. Fears
*Attorney*—Kelman and Berman

[57] ABSTRACT

A three-dimensional memory storage unit is prepared by carbonizing selected spots in a block of polymethylmethacrylate by means of a steeply converging laser beam. The energy of the beam is applied in pulses of such duration and at such intensity that carbonization takes place only at the focal point of the beam and in the immediate vicinity of the focal point while the radiant energy at a small distance from the focal point is too widely distributed to cause carbonization. By shifting the block between pulses, a three-dimensional network of black, opaque spots is produced. The device is read by an optical system having a wide-angle objective lens.

10 Claims, 3 Drawing Figures

PATENTED FEB 6 1973 3,715,734

INVENTOR.
JACK FAJANS

BY Low and Berman

AGENTS

MEMORY STORAGE DEVICE AND METHOD OF MAKING THE SAME

This application is a continuation-in-part of my copending application Ser. No. 871,573, filed on Nov. 10, 1969, and now abandoned, and itself a continuation of my abandoned application Ser. No. 599,608, filed on Dec. 6, 1966.

This invention relates to memory storage devices and particularly to a method of storing information, and to the memory storage device which may be produced by the method.

In its more specific aspects, the invention is concerned with the permanent storage of a large body of information in a small space.

I have found that binary bits of information may be stored in a small body of material by selectively altering a readily detectable property of the material in portions of the body which define a three-dimensional network in the body. Typically, the memory storage device of my invention consists of a body of transparent material in which opaque elements are distributed at the intersections of three sets of parallel lines, the lines of each set being transverse to the lines of the other two sets. The stored information can be read without difficulty if the greatest dimension of each opaque element is substantially smaller than the spacing of the lines in each set.

Reading is further facilitated when the lines of each set are equidistant from each other, and it is more convenient to arrange respective groups of the opaque elements along lines which perpendicularly intersect each other than at any other angular relationship of the sets. Unless the transparent body consists of a unitary piece of material or is otherwise optically homogeneous, serious errors may be introduced both during the preparation of the memory device and during reading.

The memory device is prepared by converting the information to be stored into a sequence of pulses of radiant energy, and then applying the pulses to respective portions of a body of material which is substantially transparent to the radiant energy for the period of the pulse at a first level of radiation intensity, and which responds to the energy of a pulse at a second, higher intensity level by undergoing a detectable change in its physical properties. The pulses are applied to the associated portions of the body at the higher, second level of intensity while the intensity of the radiation in the remainder of the body is held at the lower first level.

The desired concentration of energy in selected portions of the body is accomplished most conveniently by applying the radiant energy to the body in the form of a beam whose rays converge in the selected portion. Beams of electromagnetic energy of all wavelengths can be focused by known measures, but those within the visible light spectrum are concentrated most conveniently by means of wide-angle lenses whose beam intensity drops to a small fraction of the focal intensity at a very small distance from the focus.

The best transparent materials for the memory storage devices of this invention which are known to me at this time are synthetic organic polymers or plastics, but inorganic materials such as glass or quartz can also be employed. When a light beam of sufficient intensity, such as a laser beam, provides the pulses of radiant energy, the polymers are locally carbonized, and glass or quartz locally lose their full transparency by the formation of cracks. The reduction in transmissivity to visible light is readily detected in either case.

Other features, additional objects, and many of the attendant advantages of this invention will be readily apparent from the following detailed description of preferred embodiments relating to the annexed drawing in which.

Figure 1:
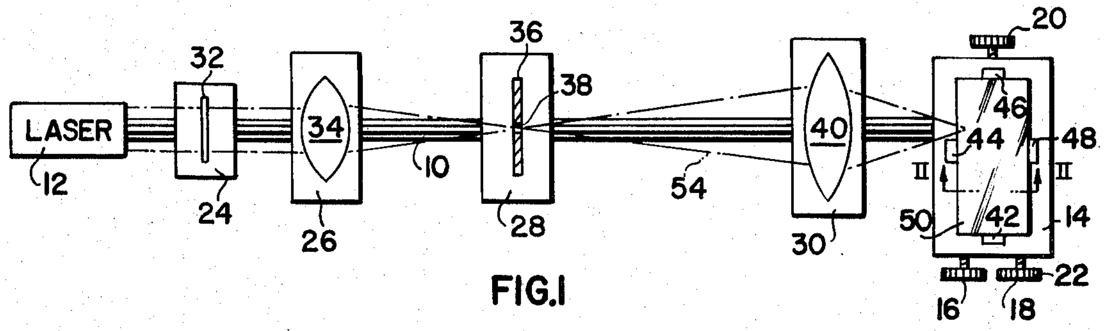
FIG. 1 shows an apparatus of the invention for producing a memory device of the invention in conventional plan view.

Referring now to the drawing in detail, there is seen an optical bench 10 on which all operating elements of the apparatus are supported. A ruby laser 12 having a cylindrical ruby crystal about four inches long by one-half inch in diameter, and conventional in itself, is mounted on one end of the bench 10. The other end carries a precision mechanical stage 14 equipped with hand wheels 16, 18 and 20 which permit the horizontal platform of the stage to be shifted in the horizontal direction of the bench axis and perpendicularly thereto in a horizontal direction and in a vertical direction in reproducible increments of 0.0001 inch. Index marks 22 on the wheels 16, 18 and 20 permit the position of the platform relative to the bench at any time to be read in all three directions of platform movement.

Four holders 24, 26, 28, 30 are arranged in sequence on the bench 10 between the laser 12 and the mechanical stage 14. A glass filter 32 is inserted in the holder 24. The holder 26 carries a condenser lens 34 having an effective diameter of three-fourths inch and a focal length of 20 inches. A stop 36 of sheet steel and having an aperture 38 of 0.01 inch diameter is mounted on the holder 28. The holder 30 supports a biconvex objective lens 40 having a diameter of 1.4 inches and a focal length of 2 inches. Two fixed abutments 42, 44 and two movable abutments 46, 48 hold a block 50 of polymethyl methacrylate in a precisely determined position on the platform of the mechanical stage 14.

The laser 12, filter 32, condenser lens 34, stop 36, and objective lens 40 are aligned along a common optical axis in such a manner that the focus of the condenser lens is located in the aperture 38 of the stop 36, and the focus of the objective lens 40 can be made to sweep practically every portion of the block 50 when the handwheels 16, 18, 20 are turned.

The filter 32 is one member of a set of interchangeable colored filters, not otherwise shown, which attenuate the laser beam to various degrees in a manner well known in itself. The laser 12 may also be operated without an attenuating filter, and its output may be controlled by varying the energy input in a known manner.

The polymethyl methacrylate block 50 consists of optical grade material and has dimensions of 1 ¼ inches × 2 ½ inches × 2 ½ inches. Its vertical square surfaces are polished so as to be optically flat and parallel.

When the laser 12 is operated, it releases pulses of radiation whose path 52 has been conventionally shown in FIG. 1. The opening of the stop 36 is projected within the plastic block 50 as an image approximately 0.0004 inch in diameter. The high concentration of energy in the focal area causes partial decomposition and carbonization of the plastic material. Because of the short focal length and great effective diameter of the objective lens 40, the area of intensive radiation sufficient to cause blackening of the plastic is limited to an approximate sphere 0.0006 inch in diameter. The transparency of the polymethyl methacrylate surrounding the sphere is not significantly affected.

Any desired cubic pattern of opaque spots 0.0006 inch in diameter may be formed in the block 50 by shifting the block upward and downward, and right and left in movements of 0.005 inch, and forward and backward in increments of 0.0033 inch. The difference in the forward and backward steps and the other steps is necessary because of the high refractive index of the plastic. One member of a pair of binary signals can thus be stored in the block at each intersection of three sets of parallel lines spaced 0.005 inch within the set, the sets being perpendicular to each other. Each pair of signals is represented by a carbon spot and the absence of a carbon spot. The memory lattice formed by the intersections of the lines has a capacity of eight million binary bits per cubic inch.

The pattern of carbon spots is formed by sequentially positioning the lattice points in alignment with the focus of the objective lens 40, and by energizing the laser 12 to emit a single pulse. This energy is sufficient to produce the desired result in the illustrated arrangement if the laser is fed 5000 joules for each pulse and has an overall efficiency of 2 percent. The losses occurring in transmitting the beam through the lenses 30, 40 and the stop 36 are approximately 50 percent. If the output of an available laser is higher than needed, the use of a colored filter 32 is advisable to prevent enlargement of the carbon spots in the block 50.

Figure 2:
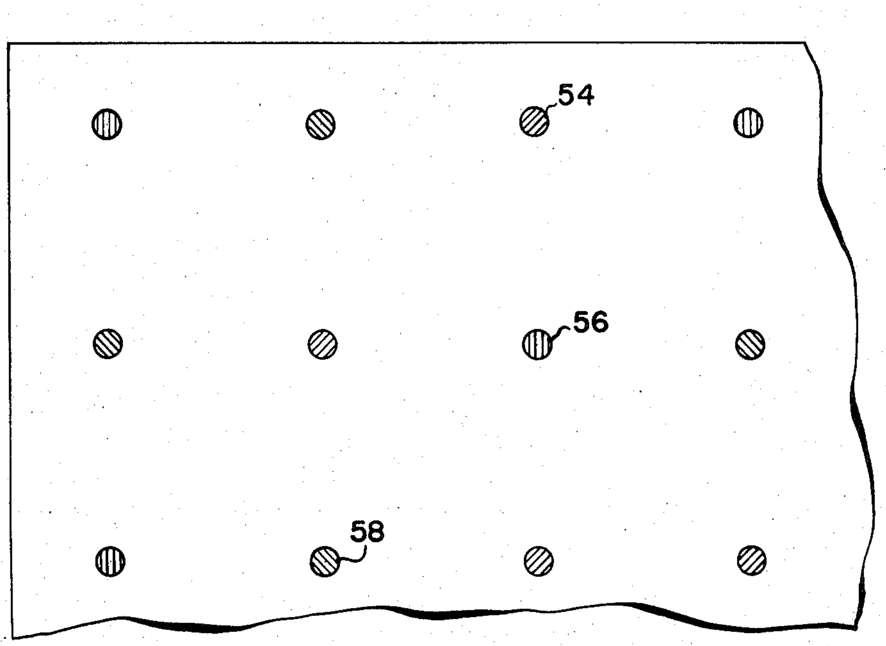
FIG. 2 illustrates a portion of the memory device prepared in the apparatus of FIG. 1 in section on the line II—II on a greatly enlarged scale.

FIG. 2 shows the memory device produced in the apparatus of FIG. 1 in section on the line II—II. Carbon spots 54, 56, 58 widely separated from each other in the plane of section and at different distances from the plane of section have been indicated by different hatching for the sake of clarity, but it will be appreciated that the appearance of the spots is not substantially affected by the overlying fully transparent plastic material.

As is evident from FIG. 2, the carbon spots 54, 56, 58 do not occupy all intersections of the three sets of lines along which groups of spots are aligned, the number of intersections in the transparent body being much greater than the number of spots. The spacing between two consecutive spots along the line of alignment is thus equal to the unit spacing of the intersecting lines of another set or to an integral multiple of that spacing.

Figure 3:
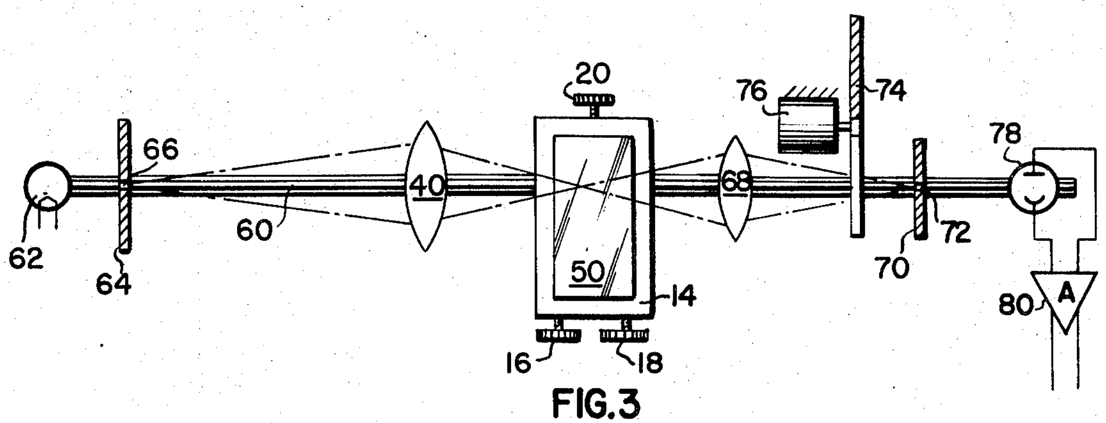
FIG. 3 shows an apparatus for reading the information stored in the device of FIG. 2 in a view corresponding to that of FIG. 1.

The reading apparatus illustrated in FIG. 3 is mounted on an optical bench 60 and is equipped with seven holders, not shown, similar to the holders 24, 26, 28, 30 and adjustable along the bench axis in the usual manner. The bench directly supports a mechanical stage 14 identical with that illustrated in FIG. 1, and operated by means of hand wheels 16, 18, 20. A non-illustrated holder at one end of the bench 60 carries a 300 watt projector lamp 62 which is shielded from the other devices on the bench 60 by a stop 64. The aperture 66 in the stop is viewed by an objective lens identical with the afore-described lens 40. The focus of the lens 40 sweeps the lattice of binary bits in the block 50 when the block moves with the mechanical stage 14 on which it is secured as described with reference to FIG. 1, but not explicitly shown in FIG. 3.

The light transmitted by the block 50 is concentrated by a positive lens 68 having an effective diameter of 1.4 inches and a focal length of 20 inches. A stop 70 is positioned on the bench 60 in such a manner that its aperture 72 of 0.1 inch diameter is at the focus of the lens 68. A shutter 74 interposed between the lens 68 and the aperture 72 consists essentially of a radially slotted disc which is rotated by a motor 76 about an axis parallel to the axis of the bench 60. The shutter exposes a photomultiplier tube 78 to the light transmitted by the lens 68 through the aperture 72. An amplifier 80 receives the output of the tube 78 to generate a pulse when the slot in the shutter 74 exposes the aperture 72.

If the hand wheels 16, 18, 20 are operated to expose the lattice of bits in the block 50 sequentially during each opening of the shutter, the amplifier produces a corresponding sequence of pulses. With a commercial photomultiplier tube, the output signals of the tube 78 are approximately five times as strong when the lens 68 focuses on a portion of the block 50 free from carbon than the signals obtained when a carbon spot is in focus. The amplifier 80 includes a pulse-height discriminator arranged in such a manner that the signals generated in the presence of a carbon spot are suppressed. The output of the amplifier thus consists of a sequence of pulses corresponding to the blank spots in the lattice of the block 50. The pulses reproduce the sequence of bits stored in the block in the apparatus of FIG. 1 if the positions of the block 50 on the two mechanical stages 14 are changed in the same sequence.

It will be appreciated that the storing of information in a block of thermally decomposable material and the reading of the information from the block may readily be automatized in an obvious manner. The handwheels 16, 18, 20 or the shafts on which they are mounted may be turned by selsyns in a conventional manner, and individual bits of information may be read out on the apparatus of FIG. 3 if so desired.

The polymethyl methacrylate and the ruby laser shown in FIG. 1 may be replaced by any other couple of a source of radiant energy and a block of material which is transparent to the radiation at a lower energy level, but responds to the same radiation at a higher energy level by changing its optical properties. Other transparent plastics may be substituted for the polymethyl methacrylate although they are not as readily available in fully transparent form. Glass has been used in conjunction with a ruby laser with moderate success. A pattern of microscopic cracks forms in the focus of the objective lens 40 when the plastic block 40 is replaced by a glass block, and the reduced transparency of the cracked areas can be read as a bit of information in the apparatus of FIG. 3. More sophisticated circuitry, however, is required in the detecting apparatus than is necessary for detecting the carbon spots in plastic.

A continuous gas laser may be substituted for the ruby laser 12 if provisions are made for shielding the block 50 from the radiant energy of the laser while the block is indexed to expose the several lattice positions. A rotary shutter analogous to the shutter 74 may be interposed between the laser and the condenser lens 34 for this purpose.

The gas laser also may be substituted for the projector lamp 62 in the readout apparatus shown in FIG. 3 and permits information to be recovered from the block 50 at a very high rate.

The radiation employed for reading the bits in the block 50 is preferably electromagnetic radiation within the visible spectrum, but other types of radiation may obviously be resorted to if the material of the block 50 is normally transparent to the radiation, and the spots produced in the recording apparatus of FIG. 1 are significantly less transparent. Suitable lens systems to replace the illustrated glass lenses 40, 68, including electromagnetic lenses, will readily suggest themselves.

Obviously, many modifications and variations of the present invention are possible in the light of the above teachings. It is, therefore, to be understood that the invention may be practiced otherwise than as specifically described.

What is claimed is:

1. A method of storing information which comprises:

a. converting said information into a sequence of pulses of radiant energy, each pulse extending over a predetermined period; and b. applying each pulse to a body of material as a beam of converging rays, 1. said material being substantially transparent to said radiant energy for said period at a first level of intensity of said energy, and responding to said energy in said period at a second level of intensity higher than said first level by undergoing detectable change in a physical property,
2. said rays converging in respective associated portions of said body,
3. the energy of each beam reaching said second level of intensity in the associated portion while not exceeding said first level of intensity while passing through other portions of said body,
4. said associated portions being distributed in said body to define a three-dimensional network.

2. A method as set forth in claim 1, wherein said energy is electromagnetic energy.

3. A method as set forth in claim 2, wherein the frequency of said energy is within the visible light spectrum, and said change includes a reduction in the transmissivity of said material to visible light.

4. A method as set forth in claim 3, wherein said material is a synthetic organic polymer, and the transmissivity of said material is reduced at least partly by carbonization of the polymer.

5. A memory storage and reading system comprising:

a. a recording apparatus including a source of a first beam of radiation;

b. a body of a recording medium, said medium being transparent to the radiation of said first beam at a lower energy level and responsive to said radiation at a higher energy level to change from a first physical state to a second physical state; and c. a readout apparatus including a source of a second beam of radiation, said medium being substantially transparent to the radiation of said second beam when in said first state thereof and more opaque to the radiation of said second beam when in said second state, said recording apparatus further including i. first mechanical stage means for supporting said body and for moving the same between a first plurality of positions offset relative to each other in three directions transverse of each other, and ii. condensing means for selectively concentrating said first beam on respective portions of said body offset relative to each other in said three directions when said body is in said plurality of positions respectively;

said readout apparatus further including i. second mechanical stage means substantially identical with said first mechanical stage means for moving said body between a second plurality of positions corresponding to said first plurality, ii. condensing means for selectively concentrating said second beam on respective portions of said body offset relative to each other in said three directions when said body has been moved by said second stage means, and iii. signal generating means for generating different electrical signals in response to radiation of said second beam respectively transmitted through portions of said medium in said first and second states, and iv. radiation transmitting means for transmitting said second beam to said signal generating means after passage of the concentrated second beam through said portions of said body.

6. A memory storage device comprising:

a. a body of solid transparent material; and b. a plurality of elements impervious to electromagnetic radiation of a predetermined range of wave lengths, said elements being distributed in said body, 1. said elements being aligned along three sets of parallel, equidistant lines,
2. a group of elements being aligned along each of said lines, and the elements of each group being spaced from each other along the associated line of alignment,
3. the lines of each set transversely intersecting the lines of the two other sets,
4. said elements being located at the intersections of said lines, and
5. the greatest dimension of each element being substantially smaller than the spacing of the lines in each of said sets.

7. A device as set forth in claim 6, wherein the number of said intersections is substantially greater than the number of said elements, and intersections free from elements are interposed between consecutive pairs of elements in a plurality of said groups, whereby the spacing of said pairs in each group of said plurality of groups is equal to the spacing of a set of the lines intersecting the line of alignment of said group, or to an integral multiple of the spacing of said intersecting lines.

8. A device as set forth in claim 7, wherein said radiation is light, and said elements essentially consist of carbon.

9. A device as set forth in claim 7, wherein said elements are substantially identical in size and shape, said sets of lines are substantially perpendicular to each other, and said body is optically homogeneous.

10. A device as set forth in claim 6, wherein said elements are located at said intersections only, the remainder of said body being optically homogeneous and separating said elements from each other.

* * * * *